(12) United States Patent
Goguen et al.

(10) Patent No.: US 7,907,712 B2
(45) Date of Patent: Mar. 15, 2011

(54) METHOD AND APPARATUS FOR PROVIDING PERSONAL MOBILITY FEATURES IN A TELECOMMUNICATIONS ENVIRONMENT

(75) Inventors: Healfdene Goguen, South Orange, NJ (US); Thomas M. Smith, Westfield, NJ (US); Pamela Zave, Chatham, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1188 days.

(21) Appl. No.: 11/086,968

(22) Filed: Mar. 22, 2005

(65) Prior Publication Data

US 2006/0215828 A1    Sep. 28, 2006

(51) Int. Cl.
*H04M 3/42* (2006.01)
*H04M 1/56* (2006.01)

(52) U.S. Cl. ......... 379/201.01; 379/142.04; 379/142.18; 379/211.02

(58) Field of Classification Search ............. 379/201.04, 379/142.01–142.18, 211.01–214.01
See application file for complete search history.

(56) References Cited

U.S. PATENT DOCUMENTS

| | | | | |
|---|---|---|---|---|
| 5,982,866 A | * | 11/1999 | Kowalski | 379/127.06 |
| 6,018,573 A | * | 1/2000 | Tanaka | 379/211.02 |
| 6,134,433 A | * | 10/2000 | Joong et al. | 455/417 |
| 6,411,692 B1 | * | 6/2002 | Scherer | 379/127.01 |
| 6,449,280 B1 | | 9/2002 | Christie | |
| 6,826,275 B1 | | 11/2004 | Jackson et al. | |
| 6,853,718 B1 | * | 2/2005 | Bedingfield et al. | 379/212.01 |
| 6,937,713 B1 | * | 8/2005 | Kung et al. | 379/211.02 |
| 6,980,636 B2 | * | 12/2005 | Fleischer et al. | 379/211.02 |
| 6,990,185 B1 | * | 1/2006 | Zave et al. | 379/201.04 |
| 6,993,360 B2 | * | 1/2006 | Plahte et al. | 455/555 |
| 7,164,762 B2 | * | 1/2007 | Hanson et al. | 379/212.01 |
| 7,286,658 B1 | * | 10/2007 | Henderson | 379/142.04 |
| 7,386,108 B1 | * | 6/2008 | Zave et al. | 379/201.04 |
| 2003/0108176 A1 | * | 6/2003 | Kung et al. | 379/211.02 |
| 2003/0147519 A1 | * | 8/2003 | Jain et al. | 379/211.02 |
| 2005/0047389 A1 | | 3/2005 | Bond et al. | |

OTHER PUBLICATIONS

Michael Jackson and Pamela Zave, Distributed Feature Composition: A Virtual Architecture for Telecommunications Services., IEEE Transactions on Software Engineering. vol. 24. No. 10. Oct. 1998.*
Jackson, M. et al., "Distributed Feature Composition: A Virtual Architecture for Telecommunications Services", IEEE Trans. on Software Engin., vol. 24, No. 10, Oct. 1998.
European Patent Office Search Report for Corresponding European Patent Application No. 06110946.8-1249.

* cited by examiner

*Primary Examiner* — Fan Tsang
*Assistant Examiner* — Mohammad Islam

(57) ABSTRACT

Personal mobility, multiparty control, and device augmentation features are provided within a voice-over-Internet protocol environment, such as a distributed feature composition (DFC) telecommunications architecture. The personal mobility features allow a caller to be identified to a callee using a desired identifier in place of an identifier of the device from which a call is made. Such personal mobility features are made available in multiparty calling environments and after mid-call moves. Device augmentation features provide enhanced calling options to a device that may otherwise be unequipped to provide such options, thus enabling personal mobility and multiparty control features across a wide variety of telecommunications devices.

20 Claims, 4 Drawing Sheets

_US 7,907,712 B2_

METHOD AND APPARATUS FOR PROVIDING PERSONAL MOBILITY FEATURES IN A TELECOMMUNICATIONS ENVIRONMENT

TECHNICAL FIELD

The present disclosure relates generally to telephonic communications, and relates more particularly to Internet-based telecommunications multimedia communications.

BACKGROUND OF THE DISCLOSURE

As technology progresses, telecommunications customers demand an increasing variety of features that are personalized in their functions, and can be used wherever the customer happens to be. Cellphones are popular because they provide one kind of personal mobility called "device" or "network-based" mobility, since the physical device may change locations without changing its network address. Cellphones, however, have many limitations with respect to voice quality, battery life, geography, and user interfaces. Also due to issues such as billing, customers cannot always use the same device for both work and personal needs.

Telecommunications software, however, is notoriously difficult to develop and upgrade. Its complex, distributed, and real-time features each have many interactions, some of which can result in unpredictable device interaction on a telecommunications network. This is further complicated by the telecommunications devices themselves having a wide variety of signaling capabilities and functionality.

Contrary to early predictions, these problems are present even in voice-over-Internet protocol (VoIP) environments. Currently, vendors of VoIP equipment are struggling to support the common dual-tone multi-frequency (DTMF) signaling of Public Switched Telephone Networks (PSTNs) with which they may interact. At the same time, it is even more difficult for them to augment existing devices to accommodate new personal mobility features.

Accordingly, there is a need for accommodating enhanced personal mobility functions in VoIP and other telecommunications environments in which feature interaction, feature expansion and device augmentation are readily accommodated.

SUMMARY OF THE DISCLOSURE

The present disclosure introduces a method and apparatus for providing personal mobility features in a telecommunications system. When a caller initiates a call to a callee, the system receives a device identifier of a telecommunications device from which the request is sent and receives a caller identifier corresponding to the caller. The personal address or caller identifier may be established by the caller and is independent of a device identifier of any telecommunications device being used by the caller. The system then applies call features subscribed to by the caller based only on the personal address of the caller, and regardless of the device currently being used by the caller. The system may require an authentication of the caller prior to establishing the call features.

The system provides further personal mobility, multiparty control and device augmentations functions that allow a caller to transfer an established call to another telecommunications device, to add callers to a call, to transfer the call to other callers, and to combine separate devices to act as a compound device during a call, or to add features to impoverished telecommunications devices.

In certain embodiments, the implementation of these call features may be performed within a distributed feature composition (DFC) telecommunications environment using appropriate feature boxes, as well as routing algorithms for establishing the precedence order thereof In further embodiments, these implementations may be included in specific DFC environments, such as those using Session Initiation Protocol (SIP).

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
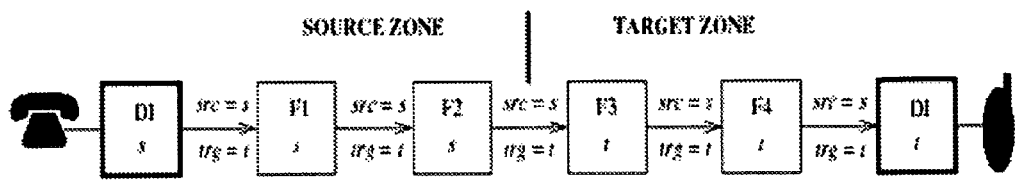
FIG. 1 is a diagram of feature boxes for a single personal call in a DFC environment as found in existing technologies.

As presented above, device mobility by itself is not a comprehensive solution to the overall problem of personal mobility. A complete solution must, in fact, incorporate software-based mobility, in which a personal address is mapped by software to the address of a device, in order to deliver personal mobility functions.

The present disclosure defines three clusters of related functions: (1) personal mobility features, including location, identification, authentication, update, and mid-call move; (2) multiparty control features, including n-way switching, n-way conferencing, hold, attended transfer, and conferenced transfer; and (3) device augmentation features, including compound devices, augmented devices, and remote devices. The meta-architecture for these clusters is based on DFC, and the accompanying Figures show how to implement many variations of them within DFC. There may be variations that have different degrees of modularity and fit different network situations. All the variations are customizable, extensible, and have well-managed feature interactions. A particular variation is realized simply by subscribing certain addresses to certain features. It does not require changes to existing features or explicit programming of the configuration. Implementation may be provided on a service-creation platform offering the DFC or similar model of telecommunication feature composition.

In DFC, a request for a call initiated by a customer is satisfied by a "usage," which may be represented as a dynamically assembled graph of boxes and internal calls. A "box" represents a software process that is applied upon receiving an internal call, which process enables either interface functions (in the case of an interface box) or feature functions (in the case of a feature box). Features may be existing telecommunications functions, such as caller identification, call forwarding, call waiting, and three-way calling. Such boxes may be established using a BoxOS operating system and appropriate programming.

An internal call is a featureless, point-to-point connection with a two-way signaling channel and any number of media channels, and is routed by a DFC router to a box according to a precedence order determined by a routing algorithm. Feature boxes are applied to calls by including the appropriate feature boxes in the appropriate zone, such as a source zone for a caller and a target zone for the callee.

It is worth noting, that the DFC internal call can have an inter- or intra-node realization. All the feature boxes appearing in usages on behalf of the same address are preferably implemented at the same network node, so the internal calls that connect them are all intra-node calls. If the feature boxes on behalf of two addresses are implemented on different network nodes, on the other hand, an internal call connecting a box of each address is an inter-node call. Thus, implementation of the usages discussed herein may be centralized or distributed depending on the type of usage.

The fundamental idea of DFC is pipe-and-filter modularity, in which each feature box behaves transparently when its functions are not needed, and has the autonomy to carry out its functions when they are required. They have appropriate programming to place, receive, or tear down internal calls. They can generate, receive or propagate signals traveling on the signaling channels of the internal calls, and can process or transmit media streams traveling on the media channels of the internal calls. A feature box interacts with other features only through its internal calls, yet does not necessarily have information about the overall endpoints of a call. Thus, each feature box is largely context independent. This allows feature boxes to be easily added, deleted and changed for a usage.

Each internal call is routed to a feature box by a DFC router, such as a computing device or enterprise server, running an appropriate DFC routing algorithm. The algorithm determines the boxes to be applied in each usage, and the precedence order of each applied box. For purposes of illustrating the functions of the DFC router, the usage will be illustrated in the context of a personal call, defined as an attempt by one person to create a telecommunications connection to another person through a DFC system. It should be noted that a personal call of this type usually involves many internal DFC routing calls for completing the connection with application of the appropriate features, including those subscribed to by a caller and/or a callee, in the appropriate zones.

As used herein, an address may represent a telecommunication device, a person, a group, or some other entity. For purposes of clarity, a personal address associated with a particular customer will be described herein using the designations "p1," "p2," etc. An address for a customer's voice channel will be referenced as "c1," "c2," etc. A compound device address will be referenced as "d1," "d2," etc. An address for a voice device (such as a telephone or cellphone) will be referenced as "v1," "v2," etc. An address for a signaling-only devices will referenced as "s1," "s2," etc.

A feature box type is the name of a program that defines the behavior of a feature box of the corresponding type. Any address can subscribe to various feature box types. Feature box types that are subscribed to by an address in the source zone of a DFC environment are those relevant to a personal call whose source is that address. Feature box types subscribed to by an address in the target zone are those relevant to a personal call whose target is that address.

Referring now to FIG. 1, there is illustrated a simple personal call in a DFC environment according to existing technologies, wherein boxes are represented as squares, and internal calls as arrows. In this case, the usage is initiated by a device interface (DI) box. It has a single source address (designated 's'), which is the address of the initiating device. It has a single target address (designated 't'), which is the address of the terminating or called DI device. Between the two DI boxes there may be a linear chain of feature boxes and internal calls. First there is a source zone, which, in the present example, consists of one instance of each of the two feature box types (F1 and F2) subscribed to in the source zone by the caller. Likewise, the target zone consists of one instance of each of the two feature box types (F3 and F4) subscribed to in the target zone by a callee.

In each zone, the order of feature boxes is constrained by a precedence order of feature box types. In the development of this chain, each feature box has received an incoming internal call routed to it by the DFC router, through appropriate signaling channels. Each box applies a "continue" function to the setup signal of an incoming call, and uses the resulting setup signal to place an outgoing internal call to the next required feature box. The setup signal of the outgoing call goes to the DFC router, which determines the next feature box type in the chain, and routes the internal call to an instance of that type.

In each of the FIGS. 1-10 herein, each internal call will be labeled with its source and target address. The direction of the arrow indicates the direction in which the call was set up. Each feature box is labeled with its box type and the address on whose behalf it appears in the usage.

Most usages are more complex than shown in FIG. 1. One complication is that, in applying the continue function to a setup signal, a feature box is allowed to specify a change of source or target address. If a source-zone feature box changes the source address from s1 to s2, for example, the router will forget all remaining feature boxes of s1, and start routing internal calls to the feature boxes in the source zone of s2. Likewise, if a target-zone feature box changes the target address from t1 to t2, for example, the router will forget all remaining feature boxes of t1, and start routing to the feature boxes in the target zone of t2. As a result, a personal call may have a "source region" and a "target region," where each region can consist of several zones, each containing feature boxes subscribed to by a different address.

The state of a chain is maintained within its setup signals, so DFC routers need not have any information about particular usages. Part of the state, for example, is a region field indicating whether a call setup is part of the source or target region. The continue function copies this region field from an old to a new setup. If a DFC router receives a setup with region=source and finds that the source region is exhausted, it may change the region of the setup to "target" before sending it to the first feature box of the target region.

Another complication found in usages is that a feature box type can be "free" or "bound." If it is free, an internal call destined for an instance of that type is routed to a new, interchangeable copy of that feature box. If it is bound, however, each instance of that box type is persistent and uniquely associated with an address. Bound boxes enable "joins" in usages. A join occurs when an internal call is routed to a bound box that is already participating in other internal calls. In the FIGS., both interface boxes and bound feature boxes are depicted with heavier lines than free feature boxes.

Some of the signals traveling on signaling channels are built-in and shared by many feature boxes. Most prominent of these are the signals used to indicate the outcome of a personal call, including: "unknown" if the target address is unknown, "avail" if the personal call is successful in reaching the person, and "unavail" for the remaining situations. In a simple usage, outcome signals travel upstream, from the callee end to the caller end.

Another important category of signals is user interface (UI) signals. Some UI signals are sent from feature boxes to devices in order to display status information and offer command choices. Other UI signals are sent from devices to feature boxes for purposes of encoding commands. In a simple usage, UI signals travel between a feature box and the device interface of the feature's subscriber (or customer). Each feature box engages in a private dialog with its subscriber, and such signals pass transparently through other feature boxes.

Feature boxes can access persistent operational data. Operational data may be written by feature boxes and is usually partitioned by feature so that it does not serve as a covert channel for undesired feature interactions. Operational data may also be partitioned by address or customer for security purposes.

A feature is an increment of functionality with a cohesive purpose. A complex feature may include several separate functions. Its implementation may be decomposed into several feature box types, each type implementing one or more feature functions. It may also have dedicated, persistent operational data.

Most multifunction features can be decomposed into feature boxes in several different ways, allowing a degree of freedom in design and implementation. Such decompositions preferably incorporate simpler and more reusable components, thus making it easier to customize complex functions by changing one or more of the function's components.

Descriptions of DFC functionality can be found in U.S. Pat. No. 6,826,275 entitled "TELECOMMUNICATIONS NETWORK SYSTEM AND METHOD" in the name of Pamela Zave et al. and assigned to the assignee of the present application, the entirety of which is herein incorporated by reference.

Turning now to FIGS. 2-10 and the accompanying descriptions, an improved DFC environment is now introduced, in which personal mobility, multiparty control and device augmentation functionality are incorporated in one implementation. It shall be readily appreciated that such features may also be provided with alternate implementations in other telecommunication environments.

The personal mobility feature introduced herein allows a customer to have a personal address that can be used to contact the customer, regardless of the customer's location. The personal address is not associated with any single telecommunications device.

Figure 2:
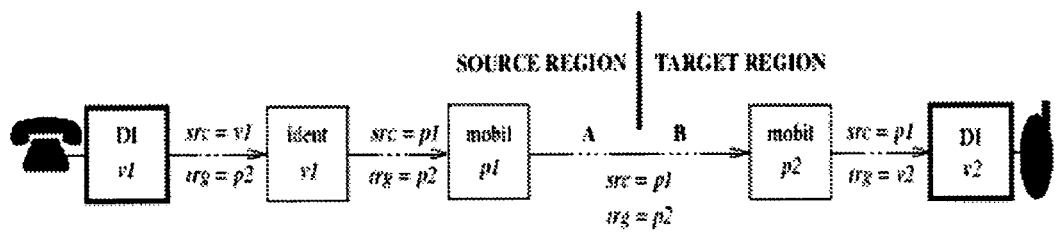
FIG. 2 is an exemplary diagram of personal mobility feature boxes for a single personal call in a DFC environment according to the present disclosure.

FIG. 2 illustrates an example in which two feature box types are used to implement the personal mobility feature. A device with address v1 subscribes to the "ident" feature box in the source zone. Personal addresses p1 and p2 both subscribe to the mobility or "mobil" feature box in both the source and target zones. FIG. 2 depicts a personal call from p1 to p2. Accordingly, the call has the source mobil feature box of p1 and the target mobil feature box of p2. The personal mobility feature includes five functions implemented within these two box types.

The first function employed by the mobil feature box is designated "location" and may be illustrated with respect to FIG. 2. Upon receiving an internal call when p1 is trying to reach p2, the mobil feature box in the target zone of p2 uses operational data to determine the telecommunication device currently being used by p2. In this case, p2 is currently using the device with address v2. The location function has many possible behaviors. For example, it can try several possible locations for a callee, sequentially or in parallel.

A companion of the location function is "identification," which may be performed by the ident feature box shown in FIG. 2. This function, which may be performed either unconditionally or only when a caller requests it, changes the source address from v1 (the device address or "device identifier") to p1 (the caller's personal address or "caller identifier"). The device identifier may be a telephone number or network address associated with the device, in the case where the device is a telephone or cellphone. The caller identifier may be any personalized identification established by the caller, such as the caller's name, nickname or any other desired message as selected by the customer. The caller identifier does not include the device identifier. The personal address of the caller may be received from the caller in any of a variety of manners including interactive voice response unit, network interface or any other means of communication. The personal address is then stored as operational data associated with the caller or a device of the caller.

This functionality has two advantages. First, the callee will know he is being called by p1 regardless of the device used by the caller, and can recognize this from the personal address p1 that is transmitted in place of the device address v1 of the device used by the caller. This has particular advantages when the caller is making the call from a device whose address is not recognizable to the callee, such as when the caller is calling from a public telephone. Second, the usage will be routed through the source zone features of p1, so that the caller will have access to all his personal features and data, regardless of his current location or device used.

The identification function may be easily abused. For example, an unauthorized person can use device v1, even though it is meant only for the use of customer p1. In another example, the owner of device v1 may attempt to program the device to provide a false identification with outgoing calls. For these reasons, there is an authentication function performed by the mobil feature box.

When a mobil feature box is in the source zone, the authentication function is activated when the mobil feature box receives its incoming call. The authentication function requests a password from the person placing the call, which may be entered vocally, by keypad, or by keyboard, depending on the device employed. The received password may then be verified against stored operational data for the customer assumed to be making the call. The call is completed only upon such verification. Since the routing algorithm guarantees that any personal call with the source address p1 is routed through the mobil feature box of p1 in the source region, this authentication function cannot be bypassed.

Although it is less common, the mobil feature box can also include a function to authenticate the callee, in case an unauthorized person or machine receives the call. This form of authentication is activated only in a target zone mobil feature box, and only when the call is answered. It does not connect caller and callee until they have verified their identification in this manner.

FIG. 2 illustrates the compositional nature of DFC in that each internal call has ellipses in it, which indicates that might be a single internal call or might also include a subgraph of boxes and internal calls. The ellipses in FIG. 2 marked A and B are of special interest with respect to authentication. Because the precedence order places the mobil feature box first in the source zone, and last in the target zone, all other personal source zone feature boxes of p1 will be found in internal call A, and all other personal target zone feature boxes of p2 will be found in internal call B. In each zone, the mobil feature box stands guard between the caller and the personal feature boxes, so that personal features cannot be accessed until the caller is authenticated.

The third function of the mobil feature box is "update," by which a caller can enter his current location from a telecommunications device. This entered information is then stored in the operational data for that caller. The information may be updated by the customer himself, or simply by using the device identifier from which the customer is calling.

Figure 3:
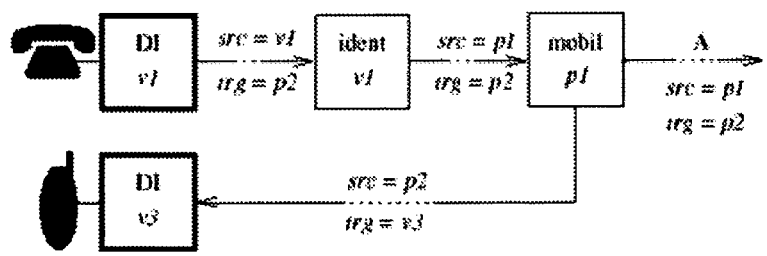
FIG. 3 is an exemplary diagram of mid-call move feature boxes in a DFC environment according to the present disclosure.

During a call, a caller may sometimes need to change locations or devices, but wishes to continue the conversation. For example, a customer p1 may be using home telephone v1, but needs to leave for work. The mobil feature box provides a fourth "mid-call move" function for this purpose, an example of which is illustrated in FIG. 3. The mid-called move function initiates an internal call to a device v3 designated by customer p1, which may be his cellphone. FIG. 3 illustrates this half of the usage of FIG. 2 after the mobil feature box has placed the internal call to device v3. The customer p1 then answers the call using device v3 and hangs up on device v1. The device v1 will subsequently tear down its internal call, and the tear down will propagate through the usage until it reaches the mobil feature box. When the usage stabilizes, the mobil feature box will once again be participating in exactly two internal calls.

Of the four functions performed by the mobil feature box, update and mid-call move work exactly the same regardless of whether the mobil feature box is in the source zone or the target zone of its personal address, and authentication works almost exactly the same in both zones. A personal address subscribes to the same mobil feature box in both source and target zones so that the customer will have access to the same functions regardless of whether he is the caller or the callee. A box type that must be subscribed to in both target and source zones is referred to herein as a reversible box type.

Recall that a feature box applies the continue method to the setup signal of an incoming call, and uses the resulting setup signal to place an outgoing call in the same region. The vast majority of internal calls are placed using the continue function, but occasionally a reversible box is sometimes required to do something different. Occasionally it must reverse the direction of a chain of internal calls. To accomplish this, it applies a "reverse" function to the setup signal an outgoing call, and uses the resulting setup signal to place an outgoing call in the opposite region. The reverse function also reverses the source and target addresses automatically.

FIG. 3 is the result of one such reverse routing which becomes necessary, for example, when a customer originally placed a personal call from a device, but now wants to be called at another device. In such instances, the mobil feature box obtains the setup signal for its internal call by reversing the setup of its original outgoing call with target address p2, which has region=source. The setup signal of the new internal call has region=target and a source address of p2.

As with the continue method, a feature box applying the reverse function can specify a change of source or target address. In this case, the mobil feature box changes the target address from p1 to v3. In doing so, it performs the location function that locates customer p1 at device v3. Here, the mobil feature box originally routed to in the source region is performing the target region function of location, and places a call in the target region.

As opposed to existing telecommunications systems in which a customer must dial into a toll free number to reach his service provider, and then dial a second number to place the outgoing call to a callee, the identification function herein allows a customer to achieve the same end result without the inconvenience of such double-dialing, so long as the device being used subscribes to the correct features.

Figure 4:
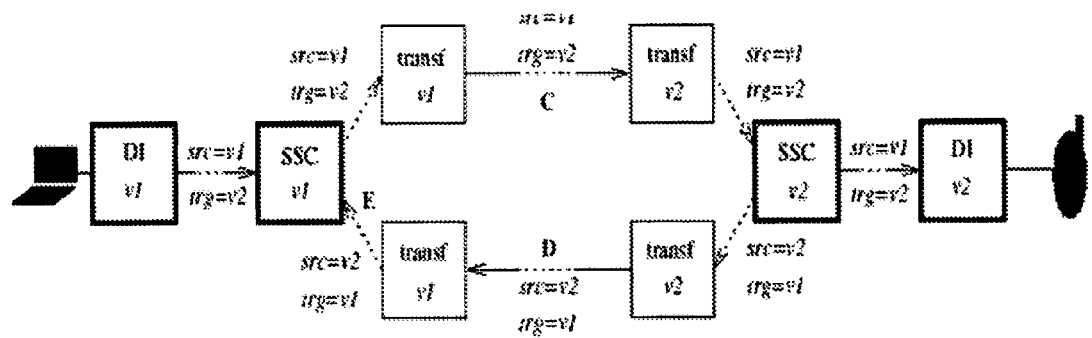
FIG. 4 is an exemplary diagram of multiparty control feature boxes in a DFC environment according to the present disclosure.

A second feature introduced to the DFC environment herein is the multiparty control feature, which allows a customer to control multiple personal calls simultaneously. The customer may switch between the calls, create conferences, and perform various transfer functions, sometimes referred to herein as call transfer and call switching functions. FIG. 4 illustrates one configuration of the boxes applied for this feature, to which the devices having addresses v1 and v2 both subscribe.

The switching and spontaneous conferencing (SSC) box type shown in FIG. 4 is both bound and reversible. A "switching" function provided by this box type is an unrestricted version of call-waiting. Referring to FIG. 4, device v1 is first used to place a personal call to device v2. The personal call is routed through the SSC feature box (that acts transparently until it features are requested by the caller at v1) in the source zone, and is then eventually routed to the SSC feature box (that acts transparently until its functions are requested by the callee at v2) in the target zone, and the call is then completed at device v2.

Now suppose the callee wishes to initiate a new personal call back to the caller at v1. The SSC feature box in the target zone receives this command and reverses the setup signal of its outgoing internal call with source=v1, target=v2, resulting in a setup signal with source=v2 and target=v1. This results in a new chain of internal calls routed to v1 through the SSC feature box in the source zone.

SSC feature boxes cause the signaling channel of the internal call on its device side to be shared among the multiple internal calls on its network side. When the SSC feature box in the source zone of FIG. 4 receives the new incoming internal call from v2, it uses the signaling channel to tell the customer at v1 that a new personal call has arrived. At this point, the customer at v1 can enter a command to answer the new personal call, which causes the SSC feature box to connect its voice channel to the voice channel of device v2.

As a result of switching capabilities, an SSC feature box can maintain any number of personal calls, any of which may be outgoing or incoming from the perspective of its associated customer. The user can connect to any one of the calls as desired, causing the SSC feature box to place all the other calls "on hold."

A "spontaneous conferencing" function of the SSC feature box enables its associated customer to group personal calls into conferences in any manner, and to change the groupings at any time. The members of a group can speak to each other at all times, as well as to the customer that initiated the conference whenever that customer's voice channel is switched to that conference. The customer who initiated a group can also transfer the entire group. In such case, all the personal calls receive transfer signals leading to the same destination.

A "transfer" function, provided by the "transf" feature boxes in FIG. 4, enables a customer to move his end of a personal call to another customer (as opposed to moving it to another device he is using, which is the purpose of the mid-call move function), after which the customer may leave the call. The transf feature box is reversible, and may be applied to both outgoing and incoming personal calls.

Figure 5:
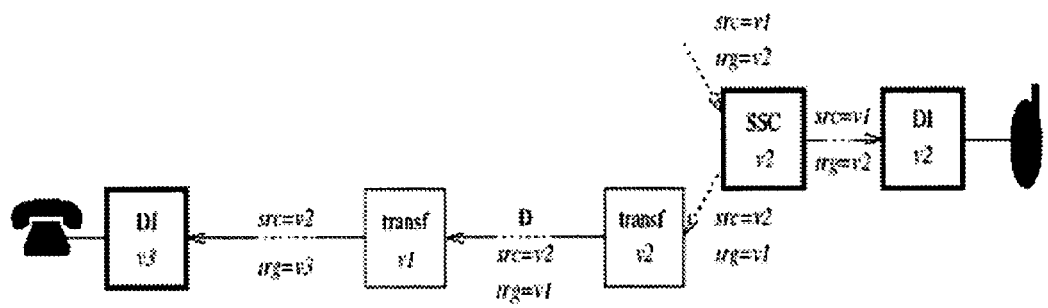
FIG. 5 is an exemplary diagram of the transfer function used for accomplishing multiparty control features according to the present disclosure.

The transf feature box responds to transfer commands initiated by its associated customer. FIG. 5 illustrates part of the usage that involves from the situation in FIG. 4, after a customer at device v1 transfers a personal call to a customer at device v3.

The SSC and transf feature boxes of the multiparty control feature are separate for two reasons. First, they may be used independently of each other and a customer need not subscribe to them both. Second, most other feature boxes that may be subscribed to go between these two feature boxes according to preferred precedence order in a DFC environment. In other words, SSC is ordered early in the source zone and late in the target zone, while transf is ordered late in the source zone and early in the target zone. In FIG. 4, most of the boxes subscribed to by v1 would be found in the area designated "E." The value of this arrangement is that when a customer transfers his end of a personal call, most of this feature boxes may no longer be included in it. This is represented in FIG. 5, where area E is gone since the call has been transferred from v1 to v3.

A third feature introduced herein is referred to as "device augmentation." Since many existing devices that are connected to telecommunications systems are impoverished in their functionality (i.e., older telephone models), they do not provide a UI or command buttons by which a customer can utilize the personal mobility and multiparty control features presented herein. Accordingly, the device augmentation feature has been added to enhance the signaling capabilities on any device that may be employed by a customer.

A "voice signaling" function provided by a device augmentation feature box enables the voice channel of a telephone to be used for signaling purposes. When a feature box sends a signal containing status information, another feature box performing this voice signaling function intercepts the signal and translates it into a tone or an announcement that is played to a customer. Such announcement may provide the customer with information as to commands that may be entered for example using a touchtone keypad of the telephone or by speaking verbal commands that may be recognized by an interactive voice response unit or the like. The customer inputs commands using touch tones, a feature box performing the voice signaling function may recognize tone sequences and translate them into command signals. A box performing voice signaling can be located anywhere in the usage between the device interface and a feature box whose user interface it is supporting.

Furthermore, a device augmentation feature box can associate a telephone device with a graphical user interface (GUI) running on a nearby computer and treat them as a compound device. Enabling this is the primary function of the compound device interface (CDI) box shown in FIG. 6. The CDI feature box acts as an interface box for a compound device with two or more such hardware components. The CDI box also includes a voice signaling function to be used as a backup when the GUI is not present. The CDI box is both reversible and bound.

Figure 6:
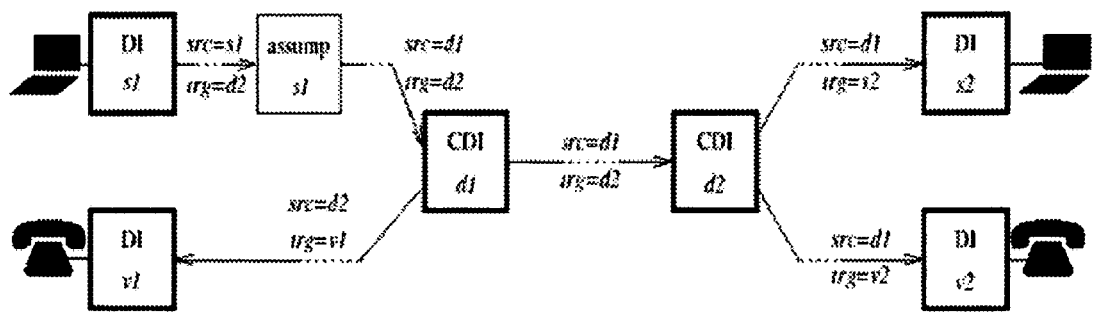
FIG. 6 is an exemplary diagram of device augmentation feature boxes in a DFC environment according to the present disclosure.

In FIG. 6, d1 and d2 are both addresses of compound devices. FIG. 6 illustrates the CDI box associated with v1 being routed to in the source zone, while the CDI box associated with v2 is routed in the target zone. Because the CDI feature box is bound, all personal calls to or from a compound device must go through the same CDI box. Accordingly, a CDI box can only have one internal call on its network side at a time.

When the CDI box associated with d2 receives an internal call, it places corresponding internal calls to the address of its signaling device s2 and the address of its voice device v2. If the call to s2 fails, then that CDI feature box provides the backup voice signaling function on the call to v2. If the call to s2 succeeds, then the CDI feature box uses its signaling channel for all user-interface signaling.

The personal call illustrated in FIG. 6 is placed by the signaling device s1 of compound device d1. Device s1 subscribes in the source zone to the "assump" feature box, which provides an "assumption" function that assumes that a caller using device d1 is the customer associated with that device. The "assump" feature box is then analogous to the "ident" feature box described earlier above. Because of the assumption function, the personal call placed in FIG. 6 is next routed to the CDI feature box associated with the customer at d1 in the source zone.

An address of the compound device acts like a personal address to identify a virtual entity comprising more than one device within a telecommunications system. Just as a personal target address is located by a mobil feature box at a device address as shown in FIG. 2, a compound device target address is located by a CDI feature box using two device addresses as shown in FIG. 6. Given the similarity, it should be readily apparent that the relationship of ident v1 and mobil p1 on the source side of FIG. 2, is identical to the relationship between assump s1 and CDI d1 on the source side of FIG. 6.

When the CDI feature box of d1 receives its incoming call, it places two outgoing calls. First, it applies the continue function to the incoming call and uses the result to place an outgoing call to d2. Next, it applies the reverse function to the outgoing call, and uses the result to place an outgoing call with source=d2 and target=v1. The telephone device with address v1 is the voice component of compound device d1.

Depending on a customer's needs, the characteristics of their devices, and telecommunications network capabilities, the personal mobility, multiparty control, and device augmentation features presented herein can be combined in many different ways. No explicit programming is needed to assemble each possible usage. To get an operable configuration of features, all the system needs to do is subscribe the right addresses to the right feature box types, and give the right address data to features that translate from one address to another. Then, as personal calls are processed, the DFC routing algorithm will dynamically assemble feature boxes into the correct precedence order for the usage.

Various combinations of the features disclosed herein, as well as combinations with existing telecommunications features offered in DFC and other environments, will now be presented. A combination of the personal mobility and multiparty control features will first be considered. These two features can be combined in a usage in two ways, depending on the signaling capabilities of the telecommunications devices employed. If some devices in an environment have UI signaling capabilities sufficient for accommodating multiparty control while others do not, it is best for only the addresses of devices with sufficient signaling capabilities to subscribe to the multiparty control feature. Referring to FIG. 2, let it be assumed that devices v1 and v2 both have such sufficient signaling capabilities. A combination of personal mobility and multiparty control features applied to a usage between v1 and v2 would then be found by nesting the configuration of FIG. 2 (except the interface boxes and devices) within area C of FIG. 4. For the addresses to match, the original target address of the upper personal call in FIG. 4 would have to be p2, and the ultimate source address would have to be p1. The same sub-graph, with v1 and v2 as well as p1 and p2 reversed, would be found nested within area D of FIG. 4. In this configuration, a customer can only move one personal call at a time with the mid-call move function.

If all or most devices can support the signaling needed for multiparty control, on the other hand, it makes little sense for personal addresses to subscribe to multiparty control. In this case, all of FIG. 4 except its interface boxes and devices, and with p1 substituted for v1 and p2 substituted for v2, would be nested within areas A and B of FIG. 2. In this configuration, the mid-call move function may be used to move all of a customer's personal calls simultaneously.

Figure 7:
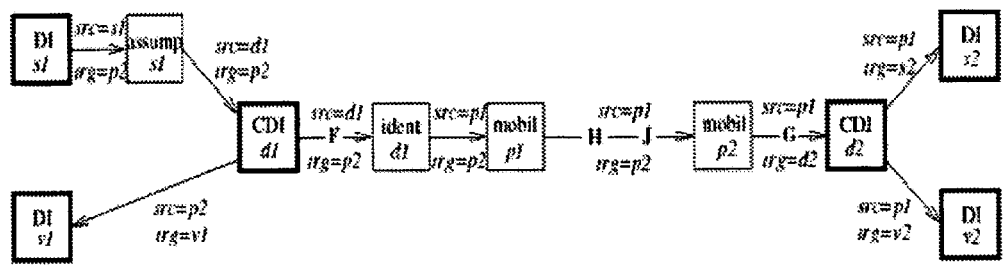
FIG. 7 is an exemplary diagram of personal mobility, multiparty control and device augmentation features cooperating in a DFC environment according to present disclosure.

Next, combinations of personal mobility, multiparty control and device augmentation will be considered. Referring to FIG. 7, there is depicted a usage between p1 and p2, using compound devices d1 and d2, respectively. In this configuration, the compound devices could subscribe to multiparty control. If so, the SSC and transf feature boxes of d1 would be located at area F along the path of the personal call shown in FIG. 7, and the SSC and transf feature boxes of d2 would be found in area G. Alternatively, the personal addresses could subscribe to multiparty control. In that case, the SSC and transf feature boxes of p1 and p2 would be found at areas H and J respectively. In either scenario, the device augmentation feature is placed between the compound devices and the multiparty control feature boxes.

Other features may be readily applied within the usage depicted in FIG. 7. For example, other source zone feature boxes of p1 would be found in area H, while other target some features of p2 would be found in area J. Such features could include personalized dialing, voicemail features, and call logging that are already provided within existing DFC environments.

Figure 8:
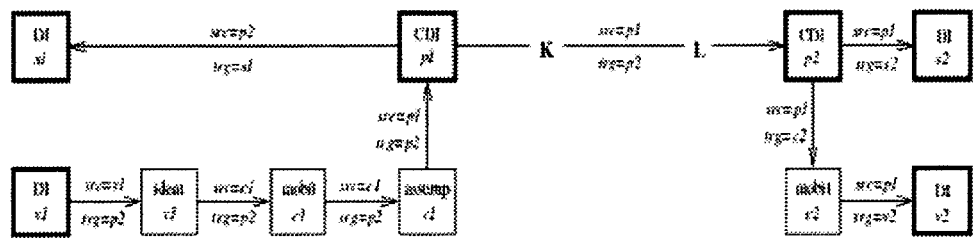
FIG. 8 is a second exemplary diagram of personal mobility, multiparty control and device augmentation features cooperating in a DFC environment according to present disclosure.

Turning now to FIG. 8, there is depicted another combination of the personal mobility and device augmentation features in a usage. Here, it is assumed that the personal addresses subscribed to the device augmentation feature. Each customer has a signaling device address, s1 and s2, that identifies a GUI with device mobility. A customer can login to a copy of the GUI on any computer and use it for any network connection. Because of this use of network-based device mobility, there is no need for software-based feature mobility on the signaling side. On the voice side, a personal CDI feature box uses personal voice channel address c1 or c2. Because the customer might want to locate his personal voice channel at any telephone, addresses c1 and c2 subscribe to personal mobility.

Both FIGS. 7 and 8 depict personal calls from p1 to p2. In FIG. 7, a customer initiated the personal call from the GUI of his compound device, but in FIG. 8, that customer initiates the personal call from his telephone. FIG. 8 demonstrates how, on the source side, personal mobility applies to c1, and c1 assumes its role as the voice channel of the compound device used by p1.

In the configuration of FIG. 8, multiparty control can only be subscribe to by personal addresses in its feature boxes can only be found in areas K and L. This is the only way that multiparty control to take advantage of device augmentation. Other source zone feature boxes of p1 would be found in area K, while other target some features of p2 would also be found in area L.

For the most part, feature interaction has been properly managed in these combinations. For example, FIG. 7 illustrates that multiparty control could be subscribed to by any of d1, d2, p1 or p2, and placing its feature boxes at areas E, F, G, and H, respectively. In all of those cases, there is a CDI feature box between the multiparty control feature box and the customer, thus providing the enhanced signaling required. FIG. 8, on the other hand, has an unresolved problem. The mobil boxes of c1 and c2 are outside the areas of the usage (K and L) where they could benefit from the user interface provided by the CDI feature box. The mobil boxes can not be placed there since the personal mobility function applies to the voice channel only.

To solve this problem, the functions of the personal mobility feature may resolved into boxes different from the manners described before. The mobil box may be reassigned to perform only the functions of location and mid-call move. A new "mobil UI" box would then perform authentication, update and the UI signaling portion of mid-call move, such that when the mobil UI box receives a move command, it sends a private move signal to the mobil box.

Figure 9:
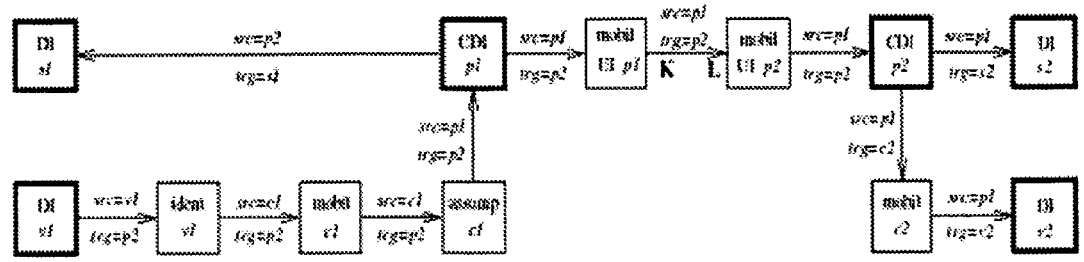
FIG. 9 is a third exemplary diagram of personal mobility, multiparty control and device augmentation features cooperating in a DFC environment according to present disclosure.

FIG. 9 demonstrates the benefits of this new decomposition. The voice channel addresses c1 and c2 subscribe to mobil feature boxes, so that mobility applies to the voice channel only. The personal addresses p1 and p2 subscribe to mobil UI, so that the user interface of personal mobility can take advantage of device augmentation. With the exception of the private move single described above, the boxes of the personal mobility feature in this configuration communicate only through operational data.

Figure 10:
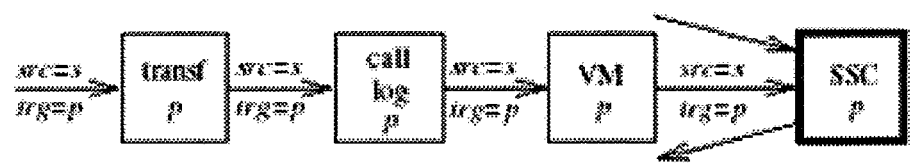
FIG. 10 is an exemplary diagram of combined new and existing target zone features applied to a usage according to the present disclosure.

Additional configurations of the features introduced herein with known telecommunications features are also possible. The target zone of a possible usage with both new and existing features is depicted in FIG. 10. Between the transf and SSC feature boxes for the multiparty control feature, there is a call log box for providing known call logging functions and a voicemail (VM) feature box for providing known voicemail features, such as recording a voicemail when the callee does not answer a call. In FIG. 10, an incoming personal call has reached an SSC box that is already engaged with other calls. If the callee signals SSC to answer the new personal call, then the SSC feature box will send an avail signal upstream on the new personal call and open the voice channel to the caller. If there is a timeout before the callee answers, then SSC will instead send an unavail signal upstream.

The avail signal makes the VM box act transparently, while the unavail signal triggers it to open a voice channel to the caller and offer to record a voice mail message. Recording ends when the caller completes the voicemail message, and a chain of teardown signals is propagates through the usage to the VM box. The VM box will never itself propagate a teardown further upstream in a call since the entire usage is torn-down before it can do so.

The call log feature box puts a call record in a database, in any of a variety of known manners. It should be noted the customer answer the call in the triggering a voicemail both cause a voice channel to the caller to be opened, albeit for different purposes. The call log box can typically distinguish these cases by the presence or absence of an avail signal.

The coordination of VM and transf is more subtle because transf is triggered by a transfer command from a customer rather than an outcome signal. A callee, for example, can issue a transfer command before or after an avail outcome signal is propagated. This is due to the fact that a customer may transfer a personal call before or after receiving it. Accordingly, both the transf and VM boxes function by tearing down the downstream internal calls, which are relevant to their functions, and manipulating their upstream connections to the caller. This pattern of behavior conveys priority to the upstream feature box because it is closer to the caller and can cut the downstream feature box off from the caller. To achieve this desired behavior, priority is given to the transfer function by placing the transf box upstream of the VM box.

As this example shows, the signaling interactions among features are determined by their handling of signals and their position in a usage. Among feature boxes in the target zone of an address, for example those feature boxes displayed in FIG. 10, relative position is determined by the precedence order of feature box types. In a usage, the zones are ordered according to their subscribing addresses, and this ordering can be used to ensure correct feature interactions.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A method for providing a personal mobility feature to a telecommunications call, performed over a telecommunications network, the method comprising:
   receiving a request to initiate a first call to a callee from a first device used by a caller;
   receiving an identification of a personal address associated only with the caller, the personal address received from the caller and different from a device identifier associated with any device associated with the caller;
   substituting the device identifier associated with the first device with the personal address; and
   applying a call feature to the first call based only on the personal address, the call feature being subscribed to by the caller and applied to any call initiated using the personal address on any device,
   wherein applying the call feature includes
      receiving a mid-call move command from the caller to move the first call from the device to a second device without interrupting the first call for the callee,
      determining the second device based on operational data,
      establishing a second call between the second device and a device of the callee, and
      tearing down the first call on the first device, after the caller commences the second call.

2. The method of claim 1, further comprising:
   transmitting the personal address in place of the device identifier to the callee.

3. The method of claim 1, further comprising:
   authenticating the caller prior to the applying.

4. The method of claim 3, the authenticating further comprising:
   requesting a password from the caller; and
   receiving a valid password from the caller.

5. The method of claim 1, wherein the applying is performed by a personal mobility feature box in a distributed feature composition environment.

6. The method of claim 5, wherein the personal mobility feature box comprises an identification box for receiving the personal address from the caller.

7. The method of claim 1 wherein applying the call feature further includes activating the call feature for the second call and the second device based on the personal address.

8. The method of claim 1, wherein the establishing is performed by a personal mobility feature box in a distributed feature composition environment.

9. The method of claim 1, where applying the call feature further includes receiving a call transfer command from the caller to transfer the first call to another party and transferring the first call to the party identified by the caller.

10. The method of claim 1, further comprising:
    receiving an incoming third call directed to the personal address of the caller;
    notifying the caller of the incoming third call;
    receiving a command from the caller to accept the incoming third call;
    placing the callee on hold; and
    initiating a switching function to connect the caller to the incoming third call.

11. The method of claim 10, wherein the receiving the command, the placing and the connecting are performed by a multiparty control feature box in a distributed feature composition environment.

12. The method of claim 1, wherein the device is a compound device comprising at least two telecommunications devices.

13. The method of claim 12, wherein the call feature is applied to the first call by a device augmentation feature box in a distributed feature composition environment, the device augmentation feature box for coordinating voice and signaling channels between the at least two telecommunications devices, wherein the voice channels and signaling channels are applied to separate components of the compound telecommunications device.

14. The method of claim 1, further comprising:
    receiving a command from the caller to conference the callee and a second callee;
    establishing a conference call including the caller, the callee, and the second callee, in response to the command.

15. The method of claim 14, wherein the establishing is performed by a multiparty control feature box in a distributed feature composition environment.

16. The method of claim 14, further comprising:
    transmitting the personal address in place of the device identifier to the second callee.

17. The method of claim 1, wherein the personal address is selected by the caller.

18. A method for providing a personal mobility feature to a call, comprising:
    receiving, from a caller, a request to establish a first call with a callee, the request including a personal address of the callee, the personal address different from a device identifier associated with any device associated with the callee;
    identifying the device currently associated by the callee with the personal address;
    substituting the device identifier associated with the first device with the personal address;
    applying, to the first call, a call feature subscribed to by the personal address of the callee;
    establishing the first call with the first device, wherein the call feature is accessible by the callee using the first device;
    receiving a mid-call move command from the caller to move the first call from the device to a second device without interrupting the first call for the callee;

determining the second device based on operational data, establishing a second call between the second device and a device of the callee; and tearing down the first call on the first device, after the caller commences the second call.

19. The method of claim 18, the call feature comprising at least one of:

an authentication of the callee, a call transfer function allowing the callee to transfer the first call to another party and leave the first call, a call switching function allowing the callee to switch to another call, a mid-call move function allowing the callee to move the first call to another device, a conference call function and a device augmentation function.

20. An apparatus for providing personal mobility features in a distributed feature composition telecommunication architecture having a plurality of feature boxes for establishing call features to the call, the apparatus comprising a computer server including a processor and a memory for storing and executing:

an identification box comprising programming code for authenticating a caller and associating a personal address of the caller in place with a device used by the caller, the device having a separate device identifier, the personal address being different from any device identifier associated with the caller, the personal address received from the caller and used to apply the call feature subscribed to by the caller to the call where the device identifier associated with the device is substituted with the personal address;

a mobility box comprising programming code for determining a second telecommunications device based on operational data and enabling the caller to transfer the call to the second telecommunications device in response to a mid-call move command;

a multiparty control box comprising programming code for enabling the caller to add an additional callee to the call; and a device augmentation box comprising programming code for coordinating voice and signaling channels between components of a compound telecommunications device, wherein the voice channels and signaling channels may be applied to separate components of the compound telecommunications device and wherein the identification box, the mobility box, the multiparty control box, and the device augmentation box are established in a precedence order in the call by a DFC routing algorithm.

* * * * *